(12) United States Patent
Cochran (10) Patent No.: US 8,724,757 B2
(45) Date of Patent: May 13, 2014

(54) SYMBOL TIMING SYNCHRONIZATION METHODS AND APPARATUS

(75) Inventor: Bruce Alton Cochran, Mesa, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 629 days.

(21) Appl. No.: 12/748,223

(22) Filed: Mar. 26, 2010

(65) Prior Publication Data
US 2011/0235762 A1 Sep. 29, 2011

(51) Int. Cl.
*H04L 7/00* (2006.01)

(52) U.S. Cl.
USPC .......................................... 375/354; 375/316

(58) Field of Classification Search
USPC .................................. 375/354, 355
See application file for complete search history.

(56) References Cited

U.S. PATENT DOCUMENTS

| 5,881,110 | A | 3/1999 | Cochran | |
|---|---|---|---|---|
| 6,173,011 | B1* | 1/2001 | Rey et al. | 375/233 |
| 6,724,847 | B1* | 4/2004 | Kallman et al. | 375/355 |
| 7,733,983 | B2* | 6/2010 | Kroeger et al. | 375/320 |
| 2002/0181622 | A1* | 12/2002 | Boutros et al. | 375/343 |
| 2008/0178060 | A1* | 7/2008 | Takashi et al. | 714/763 |

OTHER PUBLICATIONS

Farrow, C.W. "A Continuously Variable Digital Delay Element," IEEE International Symposium on Circuits and Systems, Jun. 7-9, 1988. vol. 3. pp. 2641-2645.
Gardner, F.M. "A BPSK/QPSK Timing-Error Detector for Sampled Receivers," IEEE Transactions on Communications, vol. Com -34, No. 5, May 1986.
Navarro Jr., R.D., et al. "Performance Analysis of the Gardner Timing Detector Over Pi/4—DQPSK Modulation," 3rd National ECE Conference, Univeristy of the Philippines, Diliman, Quezon City, Nov. 2002.

* cited by examiner

*Primary Examiner* — Shuwang Liu
*Assistant Examiner* — David Huang
(74) *Attorney, Agent, or Firm* — Ingrassia, Fisher & Lorenz PC (57) ABSTRACT

Embodiments include methods and apparatus for performing symbol timing synchronization for a symbol-bearing signal. The symbol-bearing signal is sampled to produce a plurality of symbol samples. First-direction interpolation processes are performed on the plurality of symbol samples in a first temporal direction, where the first temporal direction is a direction from a first sampling time towards a second sampling time. In addition, second-direction interpolation processes are performed on the symbol samples in a second temporal direction, where the second temporal direction is a direction from the second sampling time towards the first sampling time, resulting in a set of interpolated symbol samples.

20 Claims, 5 Drawing Sheets

| SAMPLE INDEX | VALUE |
|---|---|
| 1 | 0.12 |
| 2 | 0.87 |
| 3 | 0.14 |
| 4 | 0.89 |
| ⋮ | ⋮ |
| 1597 | 0.25 |
| 1598 | 0.98 |
| 1599 | 0.73 |
| 1600 | 0.26 |

SYMBOL TIMING SYNCHRONIZATION METHODS AND APPARATUS

TECHNICAL FIELD

The inventive subject matter generally relates to methods and apparatus for performing symbol timing synchronization.

BACKGROUND

Various types of wired and wireless communication receivers are configured to receive and sample symbol bearing signals. Ideally, a receiver would sample each received symbol at a time that corresponds to a center of the symbol's duration. However, a typical receiver does not know, a priori, when such a time will occur. In addition, drifting of a receiver clock with respect to a transmitter clock may cause the zero crossing points of the received symbols to slide, in time, relative to the receiver sampling clock. Accordingly, even if the receiver clock is synchronized with the centers of the symbol durations at a given time, the drifting of the receiver clock may gradually result in a loss of such synchronization, ultimately resulting in sampling that occurs closer to symbol boundaries, when samples corresponding to accurate symbol values are not reliably obtainable.

In order to produce relatively accurate symbol estimates in the presence of unsynchronized transmitter and receiver clocks, a typical receiver may sample a symbol bearing signal at a sampling rate of twice the symbol rate (e.g., the Nyquist rate), thereby producing two samples per symbol. The receiver may thereafter perform interpolation processes using consecutive groups of symbol samples to produce output symbol estimates at the symbol rate. For example, given a group (e.g., from two to five) of consecutive symbol samples, an interpolation process may include using an interpolation equation to compute intermediate values between the consecutive symbol samples. Ideally, interpolation factors associated with the equation are established to produce an accurate estimate of a symbol sample corresponding roughly to a center of the symbol duration. Inaccurate interpolation factors may result in inaccurate symbol determinations and, accordingly, relatively high symbol error rates.

At the beginning of a transmission, the timing of symbol boundaries is unknown. Accordingly, initially-established interpolation factors may not produce accurate symbol estimates. Some receivers include a symbol tracking loop (also referred to as a bit synchronizer or time tracking loop), which is configured to estimate timing errors and to adjust the interpolation factors associated with the interpolation process. Such a symbol tracking loop enables the interpolation factors gradually to converge to values that reliably produce accurate symbol estimates. Accordingly, although the symbol error rate may be relatively high at the beginning of the transmission, the symbol tracking loop enables the symbol error rate to be decreased to a relatively low value later in the transmission. The amount of time that it takes for a symbol tracking loop to enable production of symbol estimates at an acceptable symbol error rate is often referred to as the acquisition time.

For a transmission that is continuous (e.g., streaming media and television), the existence of an acquisition time at the beginning of the transmission may be inconsequential, as the data conveyed at the beginning of the transmission may not be essential to the perception or enjoyment of the transmission. However, inaccurately estimated symbols at the beginning of other types of transmissions may be unacceptable. For example, accurate symbol detection across an entire transmission may be highly desired for burst-type transmissions or transmissions in which the entirety of the data is important or essential. Accordingly, methods and apparatus are needed for accurately detecting symbol values across the entirety of a transmission, including the beginning of the transmission.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the following detailed description. As used herein, the word "exemplary" means "serving as an example, instance, or illustration." Any implementation described herein as exemplary is not necessarily to be construed as preferred or advantageous over other implementations.

Embodiments include methods and apparatus for processing symbol-bearing signals, and more particularly to methods and apparatus, implemented in a wired or wireless communication receiver, for performing symbol tracking across a received symbol-bearing signal. According to an embodiment, a receiver receives and samples a symbol-bearing signal to produce a plurality of symbol samples that are stored in a buffer. The receiver then performs "first-direction" interpolation processes on the buffered symbol samples in a first temporal direction, where the first temporal direction is a direction from a first sampling time towards a second sampling time. For example, the first-direction interpolation processes may be "forward-direction" interpolation processes, which process symbol samples starting at an earliest generated sample and working toward later generated samples. This also may be referred to as a "forward interpolation pass."

The receiver next performs "second-direction" interpolation processes on the buffered symbol samples in a second temporal direction, where the second temporal direction is a direction from the second sampling time towards the first sampling time. For example, the second interpolation processes may be "reverse-direction" interpolation processes, which process symbol samples starting at the latest generated samples and working toward the earlier generated samples. This also may be referred to as a "reverse interpolation pass." Alternatively, the receiver may first interpolate symbol samples starting at the latest generated sample and working toward the earliest generated samples, and may then interpolate symbol samples starting at the earliest generated samples and working toward the later generated samples (i.e., the receiver may first perform a reverse interpolation pass and then perform a forward interpolation pass).

Either way, the first- and second-direction interpolation processes result in a set of interpolated symbol samples. The interpolated symbol samples may then be output, or one or more additional first-direction and/or second-direction interpolation processes may be performed on the symbol samples prior to outputting the interpolated symbol samples. As will be described in more detail below, embodiments may enable symbol error rates associated with symbols as the beginning of a transmission to be reduced dramatically, because the weighting applied (or the interpolation factor) to the early symbol samples may be significantly more accurate on the second-direction pass, as opposed to the weighting applied (or the interpolation factor) on the first-direction pass.

Although the below-described embodiments are described as processing a symbol-bearing signal that is formatted as a signal burst, it is to be understood that embodiments also may be used to process data blocks associated with a continuous signal (e.g., a stream of symbols conveyed in a signal having a long or indefinite duration). In the continuous signal case, groups of symbol samples may be collected and processed as if each group represented a burst of symbols.

Figure 1:
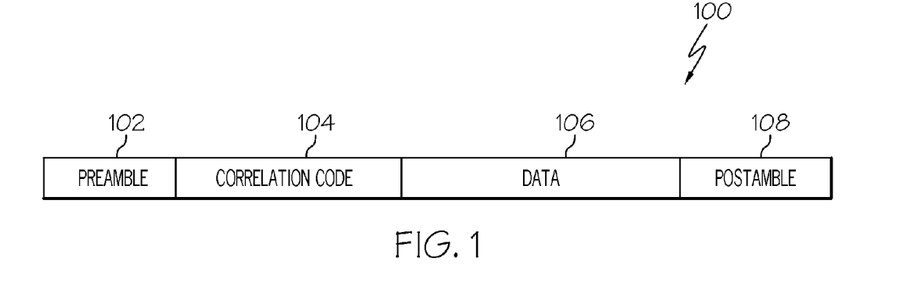
FIG. 1 is an example of a burst signal packet structure, according to an exemplary embodiment.

FIG. 1 is an example of a burst signal packet structure 100, according to an exemplary embodiment. Burst signal packet structure 100 includes a preamble 102, a correlation code 104, a data field 106, and a postamble 108. In alternate embodiments, one or more of the preamble 102, correlation code 104, and postamble 108 may be excluded from the burst signal packet structure, and/or the burst signal packet structure may include one or more additional fields (e.g., a cyclic redundancy check (CRC) field, a pad block, or other fields). In addition, other embodiments may include multiple correlation codes 104 and data fields 106.

Preamble 102 includes a series of flag bytes, and is designed to enable a receiver to acquire the signal (e.g., to break squelch and perform clock recovery, among other things). Correlation code 104 is a fixed sequence of bytes that are designed to indicate the start of the data field 106. The correlation code 104 also may indicate characteristics of the data field 106 (e.g., encoding scheme, field width, and so on). Desirably, the correlation code 104 has the characteristics of having a high auto-correlation and a low cross-correlation. For example, correlation code 104 may include a Barker sequence, a Gold code, or some other type of fixed sequence or code. Postamble 108 also includes a series of bytes, and is designed to provide separation between the end of the data field 106 and a transmitter un-key event.

Data field 106 includes a plurality of symbols, which may be encoded and modulated various techniques. For example, but not by way of limitation, each symbol may represent one or more bits encoded using some type of an error-correcting code (e.g., convolutional, Reed Solomon, and so on). Alternatively, the symbols may not be encoded, or may be encoded using something other than an error-correcting coding scheme. In addition, the symbols comprising data field 106 may be modulated using quadrature amplitude modulation (QAM), phase shift keying (PSK), amplitude shift keying (ASK), frequency shift keying (FSK), or some other modulation technique. Accordingly, a signal transmitted using the above-described burst signal packet structure 100 and modulation scheme may actually be a differentially encoded signal, which may be mapped to both an in-phase (I) and quadrature (Q) signal components. In the description, below, processing of only a single signal component (e.g., I or Q) is described for purposes of clarity and simplicity of description. It is to be understood that parallel or consecutive processes may be performed to process both the real and imaginary signal components.

As described briefly above, a symbol-bearing signal (e.g., a signal having burst signal packet structure 100) is received and sampled by a communication receiver. More particularly, a sampling process is performed by an analog-to-digital converter of the receiver at a sampling rate that is higher than the symbol rate (e.g., the Nyquist rate or twice the symbol rate). Accordingly, the sampling process yields multiple (e.g., two or more) symbol samples per symbol.

Figure 2:
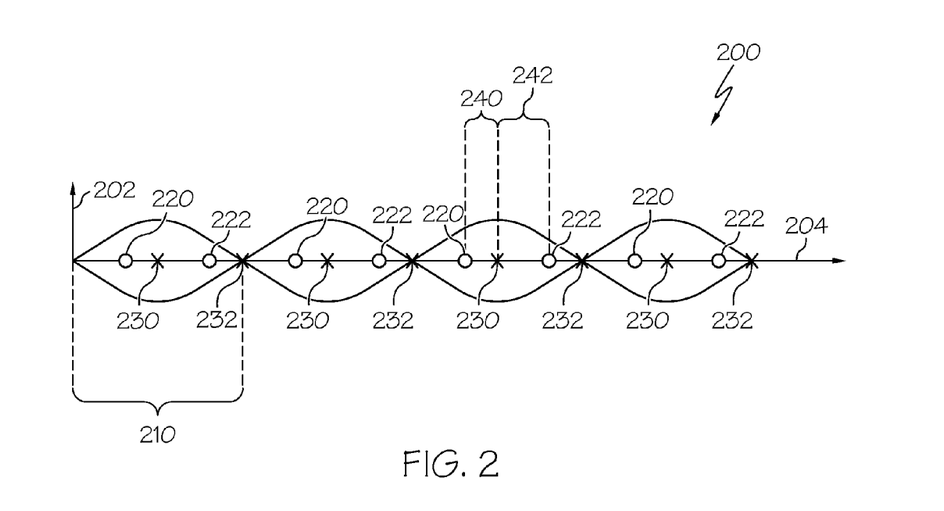
FIG. 2 is a representation of a symbol sampling timing diagram, according to an exemplary embodiment.

FIG. 2 is a representation of a symbol sampling timing diagram 200, according to an exemplary embodiment. More particularly, diagram 200 plots signal energy 202 versus time 204 for a symbol-bearing signal. Each symbol has a fixed duration 210, and symbol start and end points are indicated by zero crossings of the signal energy (e.g., at points 232). Points 220, 222 indicate sampling instances for a receiver's analog-to-digital converter (ADC), and as FIG. 2 illustrates, the ADC generates two samples per symbol, in an embodiment. For purposes of explanation, each point 220 represents a first sample for any given symbol, and each point 221 represents a second sample for any given symbol. In other embodiments, an ADC may produce more than two samples per symbol.

Ideally, the ADC would sample the symbol-bearing signal at the mid-point of each symbol duration 210, or at points 230. If the ADC samples at the Nyquist rate, samples also would be taken at each zero crossing, or at points 232, even though such samples would be indiscriminate and not computationally valuable. As described previously, however, various factors make it difficult to synchronize the ADC with sampling points 230. Accordingly, an interpolation process is performed using groups of the actual sampling points 220, 222, in an attempt to estimate the value of a symbol sample taken at ideal sampling point 230.

According to an embodiment, a symbol tracking loop within a communication device (e.g., communication device 300, FIG. 3) determines interpolation factors to be used during the interpolation process, where the interpolation factors are determined based on estimated errors between the actual and ideal sampling points (e.g., an estimate of the temporal distances between the actual sampling points 220, 222 and the ideal sampling point 230). For example, first and second temporal distances 240, 242 are defined between actual sampling points 220, 222 and ideal sampling point 230. Because temporal distance 240 is less than temporal distance 242, a presumption may be made that sampling point 220 is more likely to accurately reflect the transmitted symbol. Accordingly, the interpolation factors applied during the interpolation process will result in a relatively heavier weighting being applied to sampling point 220 and a relatively lighter weighting being applied to sampling point 222. Through the duration of the burst, the symbol tracking loop continues to update the interpolation factors, thus accounting for any clock drift that may be present between transmit and receive clocks.

Initially (e.g., at the beginning of a burst or transmission), and for the purpose of processing initialization, the interpolation factors may be set to default values, which are unlikely accurately to reflect the temporal distances between the actual and ideal symbol samples. With the potentially inaccurate interpolation factors, symbols are more likely to be inaccurately estimated at the beginning of a burst. According to an embodiment, a receiver performs first interpolation processes across a set of buffered symbol samples in a first temporal direction (e.g., starting at a first symbol sample in a buffer and ending at a last symbol sample in the buffer or in a "forward"

direction), and the receiver then reverses the direction of the interpolation process and performs second interpolation processes in a second temporal direction (e.g., starting at the last symbol sample in the buffer and ending at the first symbol sample in the buffer or in a "reverse" direction). Alternatively, the receiver may perform the first interpolation processes in the second temporal direction, and may thereafter perform the second interpolation processes in the first temporal direction. Either way, during both the first and second interpolation processes, the symbol tracking loop continuously updates the interpolation factors so that, by the time that the second interpolation processes are completed (e.g., in the former embodiment, the reverse interpolation pass approaches the symbol samples associated with the beginning of the burst), the interpolation factors may be sufficiently accurate to produce accurate symbol estimates (e.g., for the symbols corresponding to the beginning of the burst). The interpolated symbol samples produced during the second interpolation processes (e.g., during the reverse interpolation pass) may then be output for further processing by the communication device, in an embodiment. Alternatively, one or more additional forward and reverse interpolation passes may be performed before outputting the interpolated symbol samples.

The above-described embodiment enables more accurate interpolated symbol samples to be produced than would be produced using a single, forward interpolation pass. Because an ideal sampling point at the beginning of a burst may be different from an ideal sampling point at the end of the burst (e.g., due to clock drift), repeated forward interpolation passes would produce less accurate results than the above-described embodiment that includes a forward interpolation pass followed by a reverse interpolation pass (and possibly additional forward and reverse interpolation passes after that), or vice versa. Using the various embodiments, more accurate results are achieved using consecutive forward and reverse interpolation passes, because the continuity of the interpolation factor is maintained between the passes.

Figure 3:
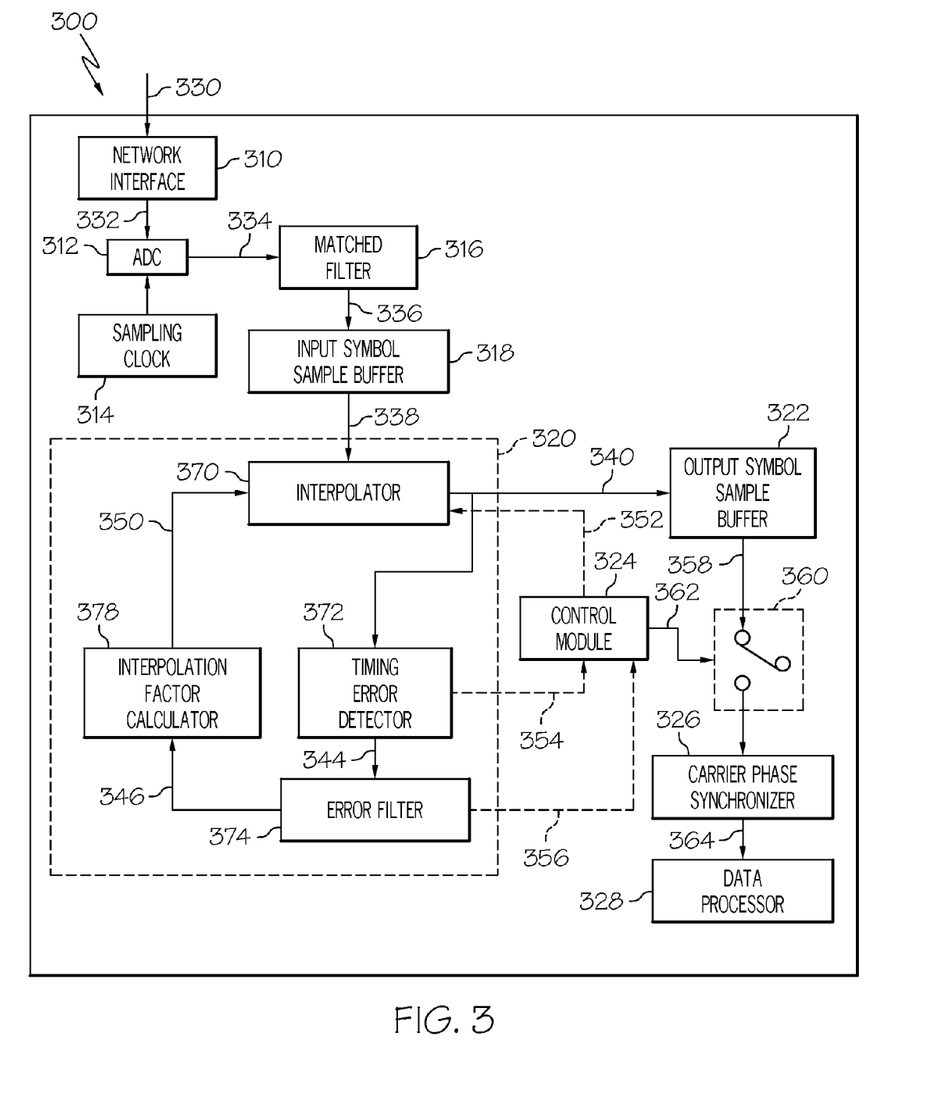
FIG. 3 is a simplified block diagram of a communication device that includes a symbol tracking loop, according to an exemplary embodiment.

FIG. 3 is a simplified block diagram of a communication device 300 that includes a symbol tracking loop 320, according to an exemplary embodiment. Communication device 300 is configured to receive symbol-bearing signals from other remote devices over a wired or wireless communication interface. Device 300 may be, for example but not by way of limitation, a device selected from a group of devices comprising a cellular telephone, a radio, a one-way or two-way pager, a personal data assistant, a computer (e.g., a laptop or desktop computer), and/or a base station. For purposes of simplicity, device 300 is depicted as a receive-only device. It is to be understood, however, that device 300 also may include a transmitter, and in such an embodiment, device 300 may provide for two-way communications with other remote devices.

Device 300 includes a network interface 310, and analog-to-digital converter (ADC) 312, a sampling clock 314, a matched filter 316, an input symbol sample buffer 318, a symbol tracking loop 320, an output symbol sample buffer 322, a control module 324, a carrier phase synchronizer 326, and a data processor 328, according to an embodiment. Network interface 310 is configured to receive an input signal 330 from a wired or wireless external network (e.g., a cellular or other radio network, the Internet, a personal, wideband or local area network (PAN, WAN, LAN), or another type of network). The input signal 330 conveys a sequence of symbols, which may be continuously transmitted or transmitted as a burst. In order to provide an example for the purpose of enhanced understanding of an embodiment, the description below refers to a symbol burst that includes 1600 symbols.

Various advantages of the embodiments may be most apparent when used to process burst type, symbol-bearing input signals, and particularly relatively short burst type, symbol-bearing input signals (e.g., symbol bursts that include from 50 to 2000 symbols). However, it is to be understood that various embodiments also or alternatively may be used to process shorter or longer burst type, symbol bearing input signals, symbol-bearing input signals having relatively long durations, and/or continuously transmitted symbol-bearing input signals. Accordingly, although a particular example is discussed below for a burst type, symbol-bearing signal, the example is not meant to limit the scope of the various embodiments.

The symbols within input signal 330 may be modulated using any of a number of modulation techniques, including but not limited to quadrature amplitude modulation (QAM), phase shift keying (PSK) (including quadrature PSK (QPSK)), amplitude shift keying (ASK) or frequency shift keying (FSK), to name a few. Network interface 310 is further configured to convert the input signal 330 to an analog, symbol-bearing signal 332 that is appropriate for further processing by the device 300. Network interface 310 may include, for example, an antenna, a gain element, and one or more filters, although network interface 310 may include additional or different components, as well.

ADC 312 is configured to sample the analog, symbol-bearing signal 332 at a sampling frequency established by sampling clock 314, in order to produce a sequence of digital, symbol samples 334. According to an embodiment, the sampling frequency is at least twice the symbol rate. In a more particular embodiment, the sampling frequency equals the Nyquist rate, or twice the symbol rate. Accordingly, ADC 312 produces two symbol samples 334 per received symbol, although ADC 312 occasionally may produce a single sample or three samples per symbol, due to frequency offsets between the transmit and receive clocks and/or communication channel effects.

Matched filter 316 is configured to reduce or substantially eliminate noise from the signal conveyed by the symbol samples 334, in order to produce filtered symbol samples 336. For example, but not by way of limitation, matched filter 316 may include a square root Nyquist type of filter that is matched to the transmitter.

Figure 4:
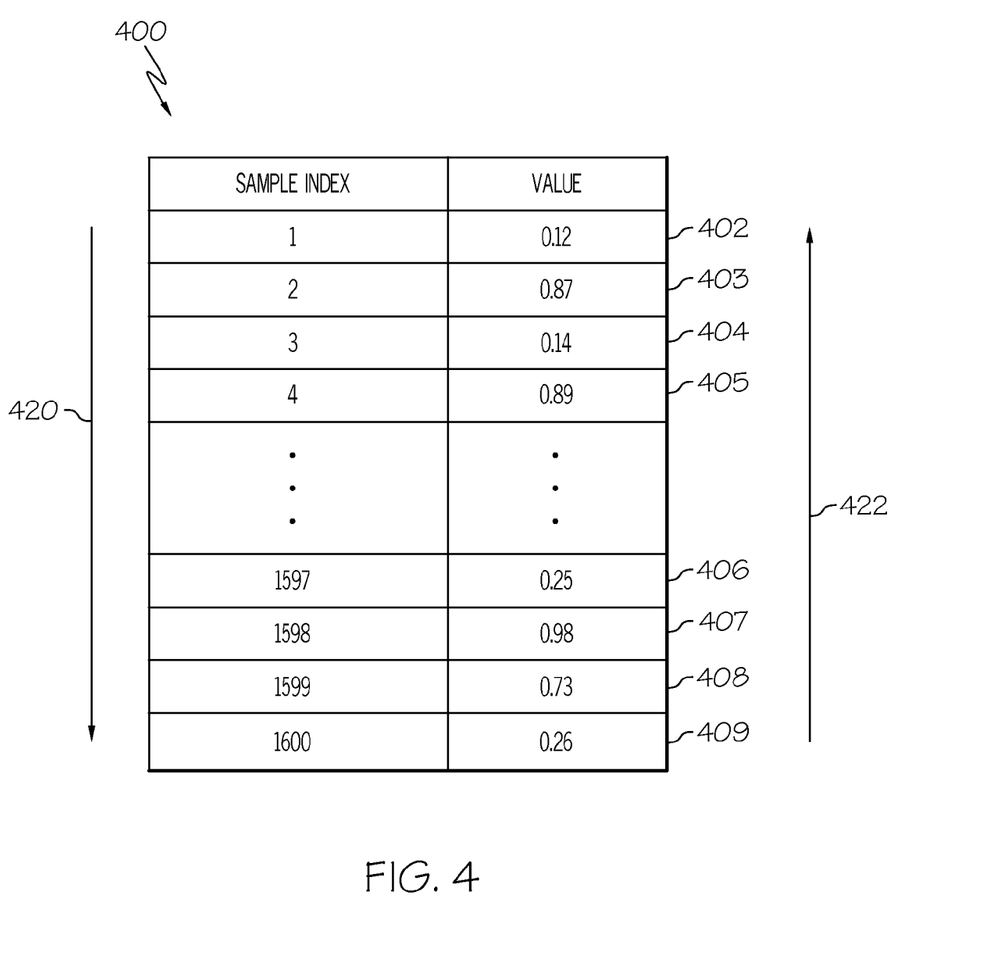
FIG. 4 is an example of an input symbol sample buffer, according to an exemplary embodiment.

Input symbol sample buffer 318 is configured to receive and store the filtered symbol samples 336 in a temporally sequential manner, meaning that symbol samples are stored in the order in which they were produced by ADC 312. FIG. 4 is an example of an input symbol sample buffer 400 (e.g., input symbol sample buffer 318), according to an exemplary embodiment. Buffer 400 includes a plurality of addressable storage locations, each of which may store a symbol sample value. In an embodiment, the symbol samples stored within buffer 400 corresponds to an entirety of a burst of symbols. Alternatively, the symbol samples stored within buffer 400 may correspond to a portion of a burst, to more than one burst, or to a portion of a symbol-bearing signal that is continuously transmitted or that has a relatively long duration.

In the illustrated example, buffer 400 is indicated to include 1600 symbol samples having normalized values, although the values alternatively may not be normalized. Each symbol sample may be accessible based on an index or address associated with the storage location within which it is stored. Although FIG. 4 illustrates buffer 400 as including 1600 storage locations corresponding to 1600 symbol samples for a burst of 800 symbols, buffer 400 may include a number of storage locations that exceeds the number of symbol samples associated with a particular burst. In addition, although buffer 400 is illustrated as a linear buffer, buffer 400 alternatively may be implemented as a circular buffer.

As mentioned above, symbol samples are stored in buffer 400 in a temporally sequential manner. Accordingly, a first symbol value (e.g., symbol value 402) is associated with a first sampling time, a last symbol value (e.g., symbol value 409) is associated with a second sampling time, and each intermediate symbol value is associated with a sampling time intermediate the first and second sampling times. The first sampling time may be earlier than the second sampling time, or vice versa. Either way, and as will be discussed in more detail below, symbol samples are accessed from buffer 400 in a first temporal direction (indicated by arrow 420) or a second temporal direction (indicated by arrow 422) during any given interpolation pass. The first temporal direction may be defined as a direction from the first sampling time 402 towards the second sampling time 409, and the second temporal direction may be defined as a direction from the second sampling time 409 towards the first sampling time 402. As used herein, the term "forward temporal direction" means a direction from an earlier sampling time towards a later sampling time (e.g., arrow 420 indicates the forward direction when first sampling time 402 is earlier than second sampling time 409), and the term "reverse temporal direction" means a direction from a later sampling time towards an earlier sampling time (e.g., arrow 422 indicates the reverse direction when second sampling time 409 is later than first sampling time 402).

As will be described in more detail below, an interpolation process includes accessing consecutive symbol sample "groups," where each symbol sample group includes a plurality of temporally consecutive symbol samples. For example, for a linear interpolator, samples 402, 403 may represent a first symbol sample group, samples 404, 405 may represent a second symbol sample group, samples 406, 407 may represent a next-to-last symbol sample group, and samples 408, 409 may represent a last symbol sample group.

Referring again to FIG. 3, the symbol samples stored within input symbol sample buffer 318 are accessed and processed by symbol tracking loop 320. According to an embodiment, symbol tracking loop 320 includes interpolator 370, timing error detector 372, error filter 374, and interpolation factor calculator 378. Interpolator 370 is configured to perform interpolation processes on the symbol samples stored within input symbol sample buffer 318. More particularly, interpolator 370 is configured sequentially to access symbol sample groups from buffer 318, to compute intermediate values between adjacent symbol samples in each group, and produce a sequence of interpolated symbol samples 340, where one interpolated symbol sample is produced for each symbol sample group. According to an embodiment, the interpolation process is a polynomial interpolation process, which may be derived using Lagrange's interpolation formula, for example. More particularly, the interpolation process may include a polynomial interpolation process, which interpolates through n+1 symbol samples using an at-most n degree polynomial. For the purpose of providing an example, only, and not of limitation, the polynomial interpolation performed by interpolator 370 may be represented as a simple linear interpolator according to the following equation:

$$Z(kT_i) = Y(m(k)T_S) + \mu(k)[Y((m(k)+1)T_S) - Y(m(k)T_S)], \quad \text{Equation 1}$$

where $Z(kT_i)$ represents an estimate of the symbol (e.g., an interpolated symbol sample), $Y(kT_S)$ represent adjacent symbol samples, $m(k)$ is a basepoint index, and $\mu(k)$ is a fractional index. The basepoint index and/or the fractional index, which may be provided by interpolation factor calculator 378 as described in more detail below, may be individually or collectively referred to herein as an "interpolation factor." Although a simple linear interpolator is provided as an example, above, those of skill in the art would understand, based on the description herein, that a higher-order interpolator may be used, as well, in various embodiments. In an alternate embodiment, a spline interpolation may be implemented, rather than a polynomial interpolation.

As will be described in more detail below, the interpolation processes performed by interpolator 370 include one or more first-direction interpolation processes and one or more second-direction interpolation processes, performed in an alternating order (e.g., each sequence of first-direction interpolation processes is followed by a sequence of second-direction interpolation processes, and vice versa if more than one of each is performed). As used herein, the term "first direction interpolation processes" means a sequence of interpolation processes in which symbol sample groups sequentially are accessed and interpolated in a first temporal direction (e.g., a temporal direction indicated by arrow 420, FIG. 4), and the term "second direction interpolation processes" means a sequence of interpolation processes in which symbol sample groups sequentially are accessed and interpolated in a second temporal direction (e.g., a temporal direction indicated by arrow 422, FIG. 4).

The direction in which interpolator 370 performs the interpolation processes may be determined based on a control signal 352 from control module 324 and/or a processing direction control variable whose value establishes the current temporal direction for processing. In an embodiment, the current temporal direction for processing may be indicated, at any given time, to be a forward temporal direction (or a first temporal direction) or to be a reverse temporal direction (or a second temporal direction). Control signal 352 or the processing direction control variable may be a binary indication (e.g., asserted or not asserted in the case of a control signal 352, or "0" or "1" in the case of a stored processing direction control variable), in an embodiment. In an embodiment, for a next interpolation process, interpolator 370 knows to access either a symbol sample group above or below a current symbol sample group based on the current temporal direction for processing.

The interpolation factors, $m(k)$ and $\mu$, introduced above in conjunction with Equation 1, are initialized to starting values prior to the first interpolation process performed for a particular burst (or set of symbol samples). Because the initialized interpolation factor values are unlikely to accurately represent a desired weighting for symbol samples within a symbol sample group, symbol errors are more likely to occur for symbol sample groups that occur early in a transmission. The symbol tracking loop 320 is configured to modify the interpolation factors in a manner that the interpolation process eventually converges toward producing results having sufficient accuracy. Accordingly, after initializing the interpolation factors, the symbol tracking loop 320 thereafter modifies the interpolation factors based on timing error calculations performed using the interpolated symbol samples 340. According to an embodiment, the error calculations and interpolation factor modifications are performed by timing error detector 372, error filter 374, and interpolation factor calculator 378.

Timing error detector 372 may include, for example but not by way of limitation, a zero-crossing timing error detector, a digital time tracking loop, a Gardner detector (based on a maximum likelihood (ML) estimation) or another type of timing error calculator. Timing error detector 372 is configured to compare the interpolated symbol samples 340 with a locally generated signal in each symbol period, in order to generate error values 344 based on the interpolated symbol samples 340. The error values 344 represent estimates of how delayed the actual sampling times (e.g., actual sampling times 220, 222, FIG. 2) are from an ideal sampling time (e.g., sampling time 230, FIG. 2). Referring again to the previous discussion of FIG. 2, for example, the delay (or error) between the actual and ideal sampling points may be indicated by the temporal distances (e.g., distances 240, 242, FIG. 2) between the actual and ideal sampling points, and each error value 344 indicates these temporal distances. Accordingly, each error value 344 indicates a desired, relative weighting that should be applied during the interpolation processes to the symbol samples within a symbol sample group. Referring again to Equation 1, the relative weighting is defined by the fractional index, μ, and thus the fractional index is calculated based on the error values 344, in an embodiment. Timing error detector 372 may generate an error value 344 for each interpolated symbol sample 340, although timing error detector 372 alternatively may generate error values 344 less frequently.

In order to track out phase and frequency errors (e.g., due to sampling rate differences between the transmitter and receiver, Doppler shift, and so on), error filter 374 is configured to receive and filter the error values 344, thus producing a filtered error value 346. According to an embodiment, error filter 374 may include a proportional plus integral (PI) configuration, although other types of error filters may be used, as well.

Interpolation factor calculator 378 updates the interpolation factors, m(k) and μ(k), based on the filtered error values 346. According to an embodiment, interpolation factor calculator 378 may include a numerically controlled oscillator (NCO), which controls the estimated timing of the loop. According to an embodiment, interpolation factor calculator 378 updates a control word, V0, each symbol period according to the following equation:

$$V_0(rN) = V_0((r-1)N) + K_0 V_C(rN), \quad \text{Equation 2}$$

where $K_0$ is an NCO constant and r is a positive integer. In an embodiment, the interpolation factors may be updated according to the following equations:

$$m(k+1) = m(k) + \lfloor \mu(k) + V_0(k) \rfloor \quad \text{Equation 3}$$

$$\mu(k) = \text{mod}(\mu(k) + V_0(k), 1). \quad \text{Equation 4}$$

Although the above equations represent a particular embodiment of how the interpolation factors may be updated, it is to be understood that the equations are provided for example purposes, and that the interpolation factors alternatively may be updated using other computations.

Interpolator 370 (or another system element) may allow access by control module 324 to information indicating from where, in input symbol sample buffer 318, interpolator 370 is accessing symbol samples 338. Accordingly, control module 324 knows when interpolator 370 is processing symbol samples corresponding to either end of the buffered symbol samples (corresponding to the beginning or the end of a burst, for example). As indicated previously, interpolator 370 may sequentially interpolate symbol sample groups in either a first or second temporal direction.

Each interpolated symbol sample 340 is stored in output symbol sample buffer 322, as mentioned previously. In an embodiment, each interpolated symbol sample 340 is stored in conjunction with an index that indicates to which symbol the interpolated symbol sample 340 corresponds.

According to an embodiment, when interpolator 370 has completed interpolation for a symbol sample group corresponding to either end of the buffered symbol samples (e.g., interpolator 370 has completed either first-direction interpolation processes or second-direction interpolation processes over all of the buffered symbol samples), the interpolation processing direction may be reversed, and interpolation processes may thereafter be performed in an opposite temporal direction. For example, referring again to FIG. 4, when interpolator 370 is processing symbol sample groups in a first temporal direction (e.g., as indicated by arrow 420), and interpolator 370 has completed interpolation for symbol sample group 408, 409 (at one end of input symbol sample buffer 318), the current temporal direction for processing may be reversed, and subsequent interpolation processes may be performed in the opposite direction. More particularly, starting at symbol sample group 406, 407 (since sample group 408, 409 had just been processed), interpolator 370 may thereafter process symbol sample groups in the second temporal direction (e.g., as indicated by arrow 422).

Interpolator 370 may continue to interpolate symbol sample groups in the second temporal direction until interpolator 370 has completed interpolation for symbol sample group 403, 402 (at the opposite end of input symbol sample buffer 318). When processing in the second temporal direction, each previously-stored, interpolated symbol sample (in output symbol sample buffer 322) is overwritten by a newly calculated, interpolated symbol sample. For example, in output symbol sample buffer 322, an interpolated symbol sample calculated and stored in conjunction with processing symbol samples 406, 407 in a first temporal direction (e.g., as indicated by arrow 420) may later be overwritten by a newly calculated, interpolated symbol sample calculated and stored in conjunction with later processing symbol samples 406, 407 in the second temporal direction (e.g., as indicated by arrow 422). Accordingly, once all interpolation passes have been completed, output symbol sample buffer 322 includes only interpolated symbol samples calculated during the last interpolation pass, in an embodiment. In an alternate embodiment, interpolated symbol samples may be stored for all interpolation passes, and subsequent processing elements (e.g., carrier phase synchronizer 326) may know to access only the interpolated symbol samples corresponding to the last interpolation pass.

As will be explained in more detail later, at least the fractional index, μ(k), is modified at each transition between processing in a first or second temporal direction, according to an embodiment. As will also be explained in more detail later, the number of interpolation passes (e.g., complete passes through buffer 318 in either the first or second temporal direction) may be set to a pre-determined value, or may be determined based on the instantaneous error 354 calculated by timing error calculator 344 or the filtered error 356 produced by error filter 374). According to various embodiments, control module 324 either maintains a count of how many interpolation passes have been performed or the instantaneous or filtered errors 354, 356, and provides additional control signals to interpolator 370 indicating when to continue or cease the interpolation processes.

When interpolator 370 has completed its final interpolation pass, control module 324 (or interpolator 370 or some other system element) may provide a control signal 362 indicating that access to the interpolated symbol samples 340 stored in output symbol sample buffer 322 may be provided to subsequent system components (e.g., carrier phase synchronizer 326 and data processor 328). Such access is indicated by switch 360, in FIG. 3, wherein access is denied when switch 360 is open (as illustrated), and access is granted when switch 360 is closed. In actuality, switch 360 may not be present in device 300.

Once access to the output symbol sample buffer 322 has been provided, carrier phase synchronizer 326 may perform phase synchronization on the interpolated symbol samples 358. The resulting, phase-synchronized symbol samples 364 may thereafter be processed by data processor 328. For example, but not by way of limitation, data processor 328 may perform various filtering, decoding, and/or data analysis processes, which may or may not result in the production of perceptible information (e.g., information that is output to a speaker or display system), an alteration of the configuration or settings of device 300, or some other result or action.

Figure 5:
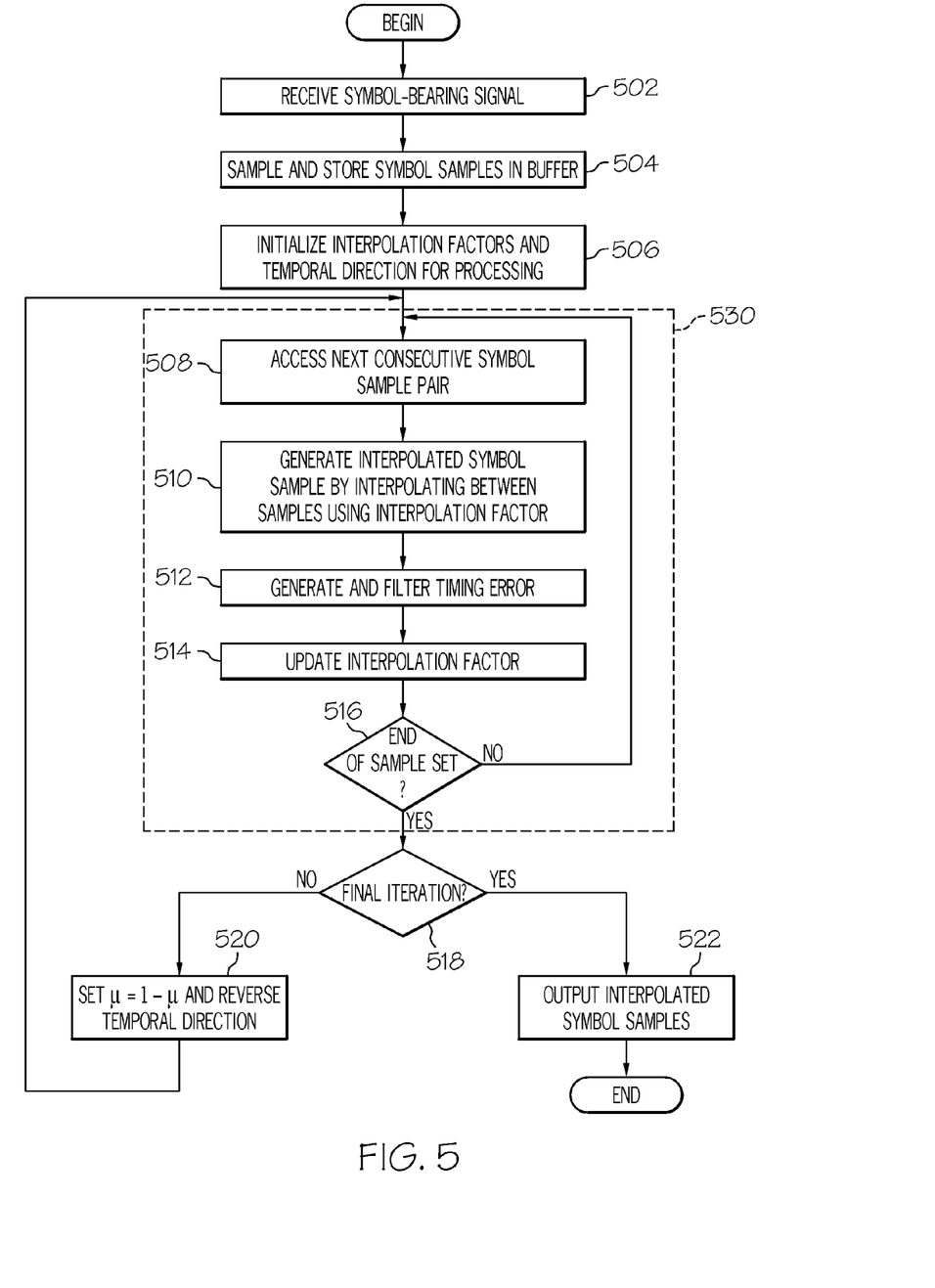
FIG. 5 is a flowchart of a method for performing symbol timing tracking, according to an exemplary embodiment.

FIG. 5 is a flowchart of a method for performing symbol timing tracking, according to an exemplary embodiment. The method may be performed by an embodiment of communication device 300 (FIG. 3), for example, although it may be performed by a communication device that is differently configured, as well. The method begins, in block 502, when the device receives a symbol-bearing signal (e.g., signal 332, FIG. 3). As discussed previously, the symbol-bearing signal may form a portion of a burst having a relatively short or long duration, or may form a portion of a continuously transmitted signal.

In block 504, the symbol-bearing signal is sampled (e.g., by ADC 312, FIG. 3), and the corresponding symbol samples are stored. According to an embodiment, the symbol samples are stored in a buffer (e.g., buffer 400, FIG. 4), although the symbol samples may be retained in another type of memory structure, as well. More particularly, the symbol samples are stored in temporal order in a buffer that has a first end corresponding to a first sampling time and a second end corresponding to a second sampling time. In an embodiment, the forward temporal direction corresponds to a direction from the first end towards the second end (e.g., as indicated by arrow 420, FIG. 4), and the reverse temporal direction corresponds to a direction from the second end towards the first end (e.g., as indicated by arrow 422, FIG. 4). As will be explained in more detail below, a forward-direction (or "first-direction") interpolation processes includes consecutively accessing groups of the buffered symbol samples in the first temporal direction, beginning at the first end of the buffer, and a reverse-direction (or "second-direction") interpolation processes includes consecutively accessing groups of the buffered symbol samples in the second temporal direction, beginning at the second end of the buffer.

In block 506, the interpolation factors and a temporal direction for processing are initialized. According to a more specific embodiment, the fractional index, $\mu(k)$, and a temporal direction for processing are initialized. The interpolation factors and temporal direction for processing may be considered variables that will be modified in conjunction with the method, and each may be stored in a register or other type of memory location. In an embodiment, the fractional index may have values between 0 and 1, inclusive, and the fractional index may be initialized to 0, 1 or any value in between. In other embodiments, the fractional index may have values within a different range and may be initialized to any value within the range.

At any given time, the temporal direction for processing may be established as either a first (e.g., forward) temporal direction or a second (e.g., reverse) temporal direction. For example, a first temporal direction may be a direction for processing symbol samples that corresponds to processing symbol sample groups in a buffer starting from a first sampling time and proceeding towards a second sampling time (e.g., the direction indicated by arrow 420, FIG. 4). In an embodiment, the temporal direction for processing is initialized to a forward temporal direction, so that the subsequent interpolation processes will sequentially access symbol sample groups starting from an earliest-produced symbol sample group and proceeding toward a latest-produces symbol sample group. In other embodiments, the temporal direction for processing may be initialized to a reverse direction for processing (e.g., starting from the second sampling time and proceeding towards the first sampling time, or in a direction indicated by arrow 422, FIG. 4).

Once initialization has been performed, a first iteration of a symbol sample interpolation procedure 530 may be performed. Essentially, each iteration of the symbol sample interpolation procedure 530 includes consecutively accessing each symbol sample group in the current temporal direction for processing, interpolating to produce samples between each symbol sample group, and dynamically updating at least the fractional index based on timing errors detected for the interpolated symbol samples. Accordingly, block 508 includes accessing a next consecutive symbol sample group (e.g., from buffer 318, FIG. 3). For example, when the temporal direction for processing is a forward direction, the first time that block 508 is executed for the forward-direction interpolation iteration, the first two symbol samples would be accessed (e.g., symbol samples 402, 403, FIG. 4). As an alternate example, when the temporal direction for processing is a reverse direction, the first time that block 508 is executed for the reverse-direction interpolation iteration, the last two symbol samples would be accessed (e.g., symbol samples 408, 409, FIG. 4).

In block 510, an interpolated symbol sample is generated by interpolating (e.g., by interpolator 370, FIG. 3) between the symbol samples using the current fractional index. For example, and as discussed previously, Equation 1 may be used in conjunction with the interpolation process. Assuming, for example, that the fractional index is initialized to 0.2, and that the first two symbol samples from buffer 400 are selected (i.e., samples 402, 403 having values 0.12 and 0.87), interpolation according to Equation 1 would yield the following result:

$$Z(kT_i)=0.12+0.2[0.87-0.12]=0.27.$$

The interpolated symbol sample (e.g., interpolated symbol sample 340, FIG. 3) may be stored in an output sample buffer (e.g., buffer 322, FIG. 3), in an embodiment. As indicated previously, the interpolated symbol sample for the first iteration of the interpolation process 530 will later be replaced by subsequently calculated interpolated symbol sample for the same symbol sample group during a next iteration of the interpolation process 530 (e.g., in the context of a reverse-direction interpolation process).

In block 512, a timing error (or delay estimate) is generated using the interpolated symbol sample (e.g., by timing error detector 372). As discussed previously, generation of the timing error includes comparing the interpolated symbol samples (e.g., samples 340, FIG. 3) with a locally generated signal in each symbol period, in order to generate error values (e.g., values 344, FIG. 3) based on the interpolated symbol samples. The resulting timing error (e.g., timing error 344, FIG. 3) may then be filtered (e.g., by error filter 374, FIG. 3) in order to produce a filtered timing error value. In block 514, at least the fractional index is updated based on the filtered timing error, and the updated fractional index is provided to the interpolator (e.g., interpolator 370, FIG. 3) for use during the next interpolation process.

A decision is made, in block 516, whether an end of the symbol sample set has been reached (e.g., whether the last symbol sample group in the current temporal direction has been interpolated and processed). For example, when the temporal direction for processing is in a forward direction (e.g., as indicated by arrow 420, FIG. 4), it may be determined that the end of the sample set has been reached upon completion of blocks 508-514 for the last symbol samples in the input buffer (e.g., symbol samples 408, 409, FIG. 4). Conversely, when the temporal direction for processing is in a reverse direction (e.g., as indicated by arrow 422, FIG. 4), it may be determined that the end of the sample set has been reached upon completion of blocks 508-514 for the earliest symbol samples in the input buffer (e.g., symbol samples 402, 403, FIG. 4). When the end of the symbol sample set has not been reached, the method iterates as shown (i.e., again accessing a next consecutive symbol sample group in block 508, and proceeding through blocks 510-516).

When the end of the symbol sample set has been reached (e.g., an entire forward- or reverse-direction interpolation process has been completed for the entire set of buffered symbol samples), then a determination is made, in block 518, whether a final iteration of interpolation process 530 has been performed. According to an embodiment, at least two iterations of interpolation process 530 are performed. For example, at least one forward-direction interpolation process and at least one reverse-direction interpolation process are performed, although not necessarily in that order. Accordingly, after completion of the first iteration of interpolation process 530 one or more additional iterations of interpolation process 530 are performed. The determination of whether the final iteration has been performed may be made based on any of several factors, in various embodiments.

For example, in an embodiment, the determination of whether the final iteration has been performed includes comparing the error, either before or after filtering, with a predetermined error threshold. When the error is greater than the predetermined error threshold, a determination may be made that the final iteration has not been performed. Conversely, when the error is less than the predetermined error threshold, a determination may be made that the final iteration has been performed.

In another embodiment, the determination of whether the final iteration has been performed includes determining whether a predetermined number of iterations has been performed. For example, the predetermined number of iterations may be a number in a range of two to twenty (or more) iterations. When the predetermined number of iterations has not yet been performed, a determination may be made that the final iteration has not been performed. Conversely, when the predetermined number of iterations has been performed, a determination may be made that the final iteration has been performed.

In yet another embodiment, the determination of whether the final iteration has been performed includes determining whether a predetermined period of time has elapsed from the time when the first iteration was initiated. For example, the predetermined period of time may be a time period in a range from 500 microseconds (μs) to 2000 milliseconds (ms), although the range may be different, as well. When the predetermined period of time has not yet elapsed, a determination may be made that the final iteration has not been performed. Conversely, when the predetermined period of time has elapsed, a determination may be made that the final iteration has been performed.

The determination of whether the final iteration has been performed may be made in other ways, as well, in other embodiments. Either way, when a determination is made that the final iteration has not been performed, then at least the fractional index and temporal direction for processing are changed, in block 520, to prepare for the next iteration of interpolation process 530. The temporal direction for processing is changed to cause the next iteration to be performed in the opposite temporal direction from the temporal direction of the immediately preceding iteration of interpolation process 530 (i.e., the iteration that was just completed). For example, if the temporal direction for processing for the immediately preceding iteration was in the forward direction (e.g., as indicated by arrow 420, FIG. 4), then the temporal direction for processing is changed to the reverse direction (e.g., as indicated by arrow 422, FIG. 4), or vice versa.

In addition, the fractional index may be modified to account for the reversal of direction when interpolation continues to be performed using the same interpolation function (e.g., Equation 1). According to a specific embodiment, the fractional index is modified according to the following equation:

$$\mu(k) = 1 - \mu(k). \qquad \text{Equation 5}$$

Figure 6:
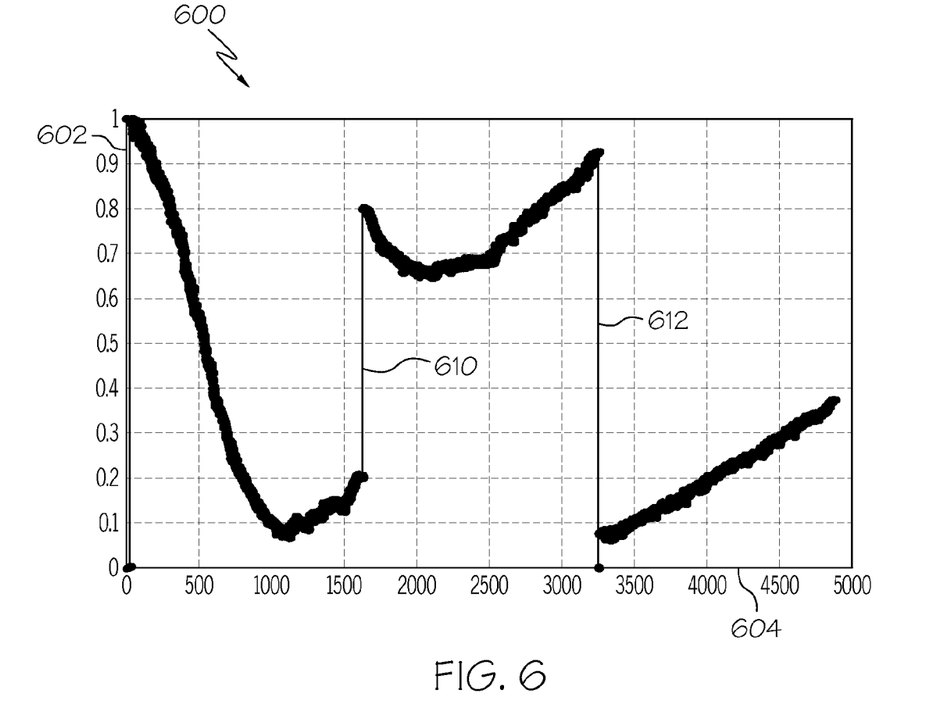
FIG. 6 is a chart illustrating interpolation factor versus symbol number, according to an exemplary embodiment.

FIG. 6 is a chart 600 illustrating the fractional index (or phase error, which is derived from the fractional index) versus symbol number, according to an exemplary embodiment. More particularly, a normalized fractional index 602 is plotted against symbol number 604. Chart 600 is an example of how the fractional index may change over the duration of a burst of 1600 symbols, and how the fractional index may be changed when the interpolation processing direction is reversed at the end of an interpolation iteration, according to an embodiment. Although the symbol numbers listed along the symbol number axis are shown to continuously increase over the duration of the chart 600, symbol numbers 1601 through 3200 actually represent processing of symbol samples corresponding to the same symbol numbers as symbol numbers 1 through 1600 (although in an opposite temporal direction), and symbol numbers 3201 through 4800 also represent processing of the symbol samples corresponding to the same symbol numbers as symbol numbers 1 through 1600 (in the same temporal direction). In other words, for example, the portion of chart 600 corresponding to symbol numbers 1 through 1600 may pertain to a first iteration of interpolation process 530 in the forward temporal direction, the portion of chart 600 corresponding to symbol numbers 1601 through 3200 may pertain to a second iteration of interpolation process 530 in the reverse temporal direction, and the portion of chart 600 corresponding to symbol numbers 3201 through 4800 may pertain to a third iteration of interpolation process 530 again in the forward temporal direction.

In the illustrated example, at symbol number 0, the fractional index is initialized to 1. The fractional index is dynamically adjusted downward during processing of symbol samples corresponding to subsequent symbols until about symbol number 1100, at which point the fractional index is dynamically adjusted upward. At symbol 1600, the fractional index is changed according to Equation 5. As FIG. 6 shows, for example, at discontinuity 610, the fractional index is changed from a value of about 0.2 to a value of about 0.8 in preparation for interpolation in the reverse temporal direction. This discontinuity 610 in the plot indicates the end of interpolation processing in a first temporal direction (e.g., forward or reverse), or the end of the buffered symbol samples, and the beginning of interpolation processing in a second temporal direction (e.g., reverse or forward). Another discontinuity 612 occurs at symbol 3200, which indicates the end of interpolation processing in the second temporal direction, or the opposite end of the buffered symbol samples, and the beginning of interpolation processing again in the first temporal direction. In an alternate embodiment, the fractional index may not be changed at each transition from forward-direction to reverse-direction processing (or vice versa). Instead, the potential discontinuity in processing that may be inherent in the transition may be accounted for by altering the equation to which the symbol samples are applied.

Referring again to FIG. 5, block 520, once the relevant variables have been adjusted to prepare for the next iteration of interpolation process 530, the next iteration is performed. When, however, a determination is made in block 518 that the final iteration has been performed, the interpolated symbol samples in the output symbol sample buffer (e.g., buffer 322, FIG. 3) are output, in block 522, to be processed by subsequent processing elements (e.g., carrier phase synchronizer 326 and data processor 328, FIG. 3). The method may then end.

Embodiments of methods and apparatus for performing symbol timing synchronization have now been described. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

Those of skill in the art will recognize, based on the description herein, that various other apparatus and processes may be included in embodiments of the systems and methods described herein for processing the various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different signals, which are described above as being exchanged between the system elements, may be combined together into single signals, and/or the information within a particular signal may be separated into multiple signals. Further, signals may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with various types of computational apparatus, including but not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An embodiment includes a method for performing symbol timing synchronization for a symbol-bearing signal. The symbol-bearing signal is sampled to produce a plurality of symbol samples. First-direction interpolation processes are performed on the plurality of symbol samples in a first temporal direction, where the first temporal direction is a direction from a first sampling time towards a second sampling time. In addition, second-direction interpolation processes are performed on the symbol samples in a second temporal direction, where the second temporal direction is a direction from the second sampling time towards the first sampling time, resulting in a set of interpolated symbol samples.

Another embodiment of a method for performing symbol timing synchronization for a symbol-bearing signal includes sampling the symbol-bearing signal to produce a plurality of symbol samples, and initializing an interpolation factor and a temporal direction for processing. The temporal direction for processing may be either a forward temporal direction or a reverse temporal direction. For at least two iterations, a symbol sample interpolation procedure is performed. Each iteration of the symbol sample interpolation procedure includes accessing, from the plurality of symbol samples, consecutive symbol sample groups in the temporal direction, and generating a set of interpolated symbol samples, where each interpolated symbol sample is generated by interpolating between symbol samples of each of the symbol sample groups using the interpolation factor to produce an interpolated symbol sample, generating an error based on the interpolated symbol sample, and updating the interpolation factor based on the error. Each iteration also includes making a determination of whether an end of the plurality of symbol samples has been reached, and when the end of the plurality of symbol samples has been reached, changing the temporal direction for processing in order to prepare for a next iteration. Each iteration also includes making a determination of whether a final iteration of the symbol sample interpolation procedure has been performed, and when the final iteration has been performed, outputting the set of interpolated symbol samples.

Yet another embodiment includes a communication device configured to perform symbol timing synchronization. The communication device includes an analog-to-digital converter, an interpolator, an error calculator, and an interpolation factor calculator. The analog-to-digital converter is configured to sample a symbol-bearing signal to produce a plurality of symbol samples. The interpolator is configured to perform first-direction interpolation processes of the plurality of symbol samples in a first temporal direction using an interpolation factor, where the first temporal direction is a direction from a first sampling time towards a second sampling time, and to perform second-direction interpolation processes of the symbol samples in a second temporal direction using the interpolation factor, where the second temporal direction is a direction from the second sampling time towards the first sampling time, resulting in a set of interpolated symbol samples. The error calculator is configured to calculate an error associated with each interpolated symbol sample, and the interpolation factor calculator is configured to dynamically adjust the interpolation factor based on the error.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method for performing symbol synchronization for a symbol-bearing signal, the method comprising the steps of:
    sampling the symbol-bearing signal to produce a plurality of symbol samples;
    alternately performing first-direction interpolation processes on the plurality of symbol samples in a first temporal direction and second-direction interpolation processes on the plurality of symbol samples in a second temporal direction to result in a set of interpolated symbol samples that are time synchronized, wherein the first temporal direction is a direction from a first sampling time towards a second sampling time, and wherein the second temporal direction is a direction from the second sampling time towards the first sampling time; and
    then performing phase synchronization on the set of interpolated symbol samples that are time synchronized.

2. The method of claim 1, further comprising, prior to performing the first-direction interpolation processes and the second-direction interpolation processes:
    storing the plurality of symbol samples in temporal order in a buffer that has a first end corresponding to the first sampling time and a second end corresponding to the second sampling time, resulting in a plurality of buffered symbol samples,
    wherein the first-direction interpolation processes include consecutively accessing groups of the buffered symbol samples in the first temporal direction, beginning at the first end of the buffer, and
    wherein the second-direction interpolation processes include consecutively accessing groups of the buffered symbol samples in the second temporal direction, beginning at the second end of the buffer.

3. A method for performing symbol timing synchronization for a symbol-bearing signal, the method comprising the steps of:
    sampling the symbol-bearing signal to produce a plurality of symbol samples;
    storing the plurality of symbol samples in temporal order in a buffer that has a first end corresponding to a first sampling time and a second end corresponding to a second sampling time, resulting in a plurality of buffered symbol samples;
    performing first-direction interpolation processes on the plurality of symbol samples in a first temporal direction, wherein the first temporal direction is a direction from the first sampling time towards the second sampling time, wherein the first-direction interpolation processes include consecutively accessing groups of the buffered symbol samples in the first temporal direction, beginning at the first end of the buffer, and wherein performing the first-direction interpolation processes includes repeatedly:
        accessing a next consecutive symbol sample group in the first direction from the buffered symbol samples;
        generating a first-direction interpolated symbol sample using a first-direction fractional index and symbol samples in the next consecutive symbol sample group;
        generating a first-direction error based on the first-direction interpolated symbol sample; and
        updating the first-direction fractional index based on the first-direction error; and
    performing second-direction interpolation processes on the symbol samples in a second temporal direction, wherein the second temporal direction is a direction from the second sampling time towards the first sampling time, resulting in a set of interpolated symbol samples, wherein the second-direction interpolation processes include consecutively accessing groups of the buffered symbol samples in the second temporal direction, beginning at the second end of the buffer.

4. The method of claim 3, further comprising:
    filtering the first-direction error prior to updating the first-direction fractional index.

5. The method of claim 3, wherein performing the second-direction interpolation processes includes repeatedly:
    accessing a next consecutive symbol sample group in the second direction from the buffered symbol samples;
    generating a second-direction interpolated symbol sample by interpolating between symbol samples in the next consecutive symbol sample group using a second-direction fractional index;
    generating a second-direction error based on the second-direction interpolated symbol sample; and
    updating the second-direction fractional index based on the second-direction error.

6. The method of claim 5, further comprising:
filtering the second-direction error prior to updating the second-direction fractional index.

7. The method of claim 5, further comprising, after performing the first-direction interpolation processes and prior to performing the second-direction interpolation processes, setting the second-direction fractional index equal to one minus the first-direction fractional index.

8. The method of claim 1, further comprising:
outputting the set of interpolated symbol samples.

9. The method of claim 8, further comprising, prior to outputting the set of interpolated symbol samples:
performing, for one or more additional iterations, additional interpolation processes of the plurality of symbol samples in a temporal direction that is opposite the temporal direction of immediately preceding interpolation processes.

10. The method of claim 1, wherein the plurality of symbol samples corresponds to an entirety of a burst of symbols.

11. A method for performing symbol timing synchronization for a symbol-bearing signal, the method comprising the steps of:
sampling the symbol-bearing signal to produce a plurality of symbol samples;
initializing an interpolation factor and a temporal direction for processing, wherein the temporal direction for processing may be either a forward temporal direction or a reverse temporal direction;
performing, for at least two iterations, a symbol sample interpolation procedure, wherein each iteration of the symbol sample interpolation procedure includes
accessing, from the plurality of symbol samples, consecutive symbol sample groups in the temporal direction,
generating a set of interpolated symbol samples, wherein each interpolated symbol sample is generated by interpolating between symbol samples of each of the symbol sample groups using the interpolation factor to produce an interpolated symbol sample, generating an error based on the interpolated symbol sample, and updating the interpolation factor based on the error,
making a determination of whether an end of the plurality of symbol samples has been reached, and when the end of the plurality of symbol samples has been reached, changing the temporal direction for processing in order to prepare for a next iteration, and
making a determination of whether a final iteration of the symbol sample interpolation procedure has been performed, and when the final iteration has been performed, outputting the set of interpolated symbol samples.

12. The method of claim 11, wherein generating the set of interpolated symbol samples further comprises, prior to updating the interpolation factor, filtering the error.

13. The method of claim 12, wherein making the determination of whether the final iteration has been performed comprises comparing the error, after filtering, with a predetermined error threshold.

14. The method of claim 11, wherein performing a symbol sample interpolation procedure further comprises setting the interpolation factor to one minus the interpolation factor when the determination is made that the end of the plurality of symbol samples has been reached, in order to prepare for the next iteration.

15. The method of claim 11, wherein making the determination of whether the final iteration has been performed comprises determining whether a predetermined number of iterations has been performed, wherein the predetermined number of iterations is a number in a range of two to twenty.

16. The method of claim 11, wherein making the determination of whether the final iteration has been performed comprises determining whether a predetermined period of time has elapsed.

17. The method of claim 11, further comprising:
storing the plurality of symbol samples in temporal order in a buffer that has a first end corresponding to a first sampling time and a second end corresponding to a second sampling time, wherein the forward temporal direction corresponds to a direction from the first end towards the second end, and wherein the reverse temporal direction corresponds to a direction from the second end towards the first end.

18. A communication device configured to perform symbol synchronization, the communication device comprising:
an analog-to-digital converter configured to sample a symbol-bearing signal to produce a plurality of symbol samples;
an interpolator configured to: generate a set of interpolated symbol samples that are time synchronized by alternately performing first-direction interpolation processes on the plurality of symbol samples in a first temporal direction using an interpolation factor, and second-direction interpolation processes on the plurality of symbol samples in a second temporal direction using the interpolation factor, wherein the first temporal direction is a direction from a first sampling time towards a second sampling time, and wherein the second temporal direction is a direction from the second sampling time towards the first sampling time; and
a carrier phase synchronizer configured to perform phase synchronization on the set of interpolated symbol samples that are time synchronized.

19. The communication device of claim 18, further comprising:
a buffer configured to store the plurality of symbol samples for access by the interpolator.

20. A communication device configured to perform symbol timing synchronization, the communication device comprising:
an analog-to-digital converter configured to sample a symbol-bearing signal to produce a plurality of symbol samples;
an interpolator configured to perform first-direction interpolation processes of the plurality of symbol samples in a first temporal direction using an interpolation factor, wherein the first temporal direction is a direction from a first sampling time towards a second sampling time, and to perform second-direction interpolation processes of the symbol samples in a second temporal direction using the interpolation factor, wherein the second temporal direction is a direction from the second sampling time towards the first sampling time, resulting in a set of interpolated symbol samples;
an error calculator configured to calculate an error associated with each interpolated symbol sample;
an error filter configured to filter the error produced by the error calculator, resulting in a filtered error
an interpolation factor calculator configured to dynamically adjust the interpolation factor based on the filtered error.

* * * * *